(12) United States Patent
Waterman et al.

(10) Patent No.: US 11,144,853 B1
(45) Date of Patent: Oct. 12, 2021

(54) RESOURCE DEMAND MANAGEMENT SYSTEMS AND METHODS

(71) Applicant: MASSACHUSETTS MUTUAL LIFE INSURANCE COMPANY, Springfield, MA (US)

(72) Inventors: Robert Waterman, Longmeadow, MA (US); Daniel Lunardini, Westfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 702 days.

(21) Appl. No.: 15/384,092

(22) Filed: Dec. 19, 2016

Related U.S. Application Data

(60) Provisional application No. 62/387,171, filed on Dec. 23, 2015.

(51) Int. Cl.
*G06Q 10/06* (2012.01)
*G06Q 10/10* (2012.01)
(Continued)

(52) U.S. Cl.
CPC .. *G06Q 10/063112* (2013.01); *G06F 3/04817* (2013.01); *G06Q 10/103* (2013.01);
(Continued)

(58) Field of Classification Search
CPC .......... G06Q 10/063112; G06Q 10/103; G06F 3/04817; G06F 3/0482; G06F 3/0486; H04L 67/02; H04L 67/42
See application file for complete search history.

(56) References Cited

U.S. PATENT DOCUMENTS 6,567,784 B2 * 5/2003 Bukow ................. G06Q 10/10
705/7.14
8,365,095 B2 * 1/2013 Bansal .................. G06Q 10/20
715/810
(Continued)

FOREIGN PATENT DOCUMENTS

WO WO-2015039209 A1 * 3/2015 ..... G06Q 10/063118

OTHER PUBLICATIONS

Nasri, M., et al. "Multi-agent control system for real-time adaptive VVO/CVR in Smart Substation." 2012 IEEE Electrical Power and Energy Conference. IEEE, 2012. (Year: 2012).*
(Continued)

*Primary Examiner* — Matthew S Gart
*Assistant Examiner* — Hamzeh Obaid
(74) *Attorney, Agent, or Firm* — Foley & Lardner LLP

(57) ABSTRACT

A server receives a request, for allocation of workforce, upon displaying a first network browser on a first client device and processes the request against a database of worker profiles and project profiles. Each of the worker profiles contains at least a worker identifier, an identified worker skill set, and a work schedule. Each of the project profiles contains a project identifier, a desired project skill set, and a desired timeframe for the desired project skill set. The server displays a second network browser on a second client device based on such processing, which contains available worker capacity and desired skills within a requested timeframe. A user operating the second client device can accept or ignore the recommendation and assign a worker to a project. The server may further update the project data and allocate the worker to the project.

20 Claims, 9 Drawing Sheets

(51) Int. Cl.
*H04L 29/06* (2006.01)
*H04L 29/08* (2006.01)
*G06F 3/0481* (2013.01)
*G06F 3/0482* (2013.01)
*G06F 3/0486* (2013.01)

(52) U.S. Cl.
CPC .............. *H04L 67/02* (2013.01); *H04L 67/42* (2013.01); *G06F 3/0482* (2013.01); *G06F 3/0486* (2013.01)

(56) References Cited

U.S. PATENT DOCUMENTS

| | | | | |
|---|---|---|---|---|
| 8,370,192 | B2* | 2/2013 | Deo | G06Q 10/063114 705/7.36 |
| 8,543,438 | B1* | 9/2013 | Fleiss | G06Q 10/0631 705/7.13 |
| 9,250,848 | B2* | 2/2016 | Morrison | G06F 3/1296 |
| 9,489,119 | B1* | 11/2016 | Smith, Jr. | G06F 40/117 |
| 10,235,646 | B2* | 3/2019 | Perry | G16H 40/67 |
| 2004/0107133 | A1* | 6/2004 | Pantaleo | G06Q 10/10 705/7.13 |
| 2004/0267595 | A1* | 12/2004 | Woodings | G06Q 10/06311 705/7.14 |
| 2005/0060217 | A1* | 3/2005 | Douglas | G06Q 10/06 705/7.14 |
| 2010/0023385 | A1* | 1/2010 | Galvan | G06Q 10/06 705/7.42 |
| 2012/0203589 | A1* | 8/2012 | Eggena | G06Q 10/06 705/7.15 |
| 2014/0172731 | A1* | 6/2014 | Ericksen | G06Q 10/105 705/320 |
| 2015/0286979 | A1* | 10/2015 | Ming | G06Q 10/06311 705/7.14 |

OTHER PUBLICATIONS

Hur, Daesik. Real-time work schedule adjustment in a quick service operation system. Indiana University, 2001. (Year: 2001).*

* cited by examiner

RESOURCE DEMAND MANAGEMENT SYSTEMS AND METHODS

TECHNICAL FIELD

This application claims priority to U.S. Provisional Patent Application Ser. No. 62/387,171, filed on Dec. 23, 2015, which is hereby incorporated by reference in its entirety.

TECHNICAL FIELD

Generally, the present disclosure relates to computing. More particularly, the present disclosure relates to data analytics and resource demand management.

BACKGROUND

In a large organization, employees, such as project managers, often seek access to various intra-organizational resources, such as subject matter experts to assist in various projects, such as information technology (IT) projects, finance projects, sales projects, or others. For example, such access can be sought for putting together a cross-functional team to solve a problem. However, allocating such resources in an efficient manner is difficult to do, especially in real-time, given organizational size, locations, cultures, language barriers, or other factors. Further, managing such sources upon allocation is also difficult, especially when some of such resources may over or underutilized or given organizational size, locations, cultures, language barriers, or other factors. Moreover, if a project has multiple phases, then measuring an aspect of each of the phases in real-time is also difficult given organizational size, locations, cultures, language barriers, or other factors. Traditional methods only provide human-driven methods of identifying qualified workforce within the company, which has proven to be inefficient and ineffective.

As the processing power of computers allow for greater computer functionality and the Internet technology era allows for interconnectivity between computing systems, many institutions use computers to identify an ideal workforce for various projects. However, since the implementation of these more sophisticated tools, several shortcomings in these technologies have been identified and have created a new set of challenges. For example, existing computer-implemented solutions for gathering and managing employee and resource records suffer from several problems, such as inefficient indexing and allocation of the workforce, inefficient access to the workforce skills records, and inefficient/inaccurate identification of workforce for specific projects. Workforce data may exist on different databases. Managing such data on different platforms is difficult due to number, size, content, or relationships of the data associated with the consumers.

BRIEF SUMMARY

For the aforementioned reasons, there is a need for a more efficient and faster system and method for processing large volume of data associated with a company's workforce, which would allow indexing, reviewing, and matching of appropriate workforce to specific projects in a more efficient manner than possible with human-intervention or conventional computer data-driven analysis. There is a need for a network and computer-specific set of rules to produce efficient and accurate results when facing a high number of combinations for workforce matches. These features allow performing large work such as time-consuming analysis, data-entry tasks, and identifying proper workforce, in a more efficient manner by using less computing power than other approaches.

In an embodiment, a method comprises generating, by a server, a worker profile dataset comprising a unique worker identifier, a worker skill identifier, and a worker work schedule. The method comprises generating, by the server, a first instruction to store the worker profile dataset. The method comprises transmitting, by the server, the first instruction to a database. The method comprises generating, by the server, a project profile dataset comprising a unique project identifier, a project timeframe, and a project desired skill identifier. The method comprises generating, by the server, a second instruction to store the project profile dataset. The method comprises transmitting, by the server, the second instruction to a database. The method comprises generating, by the server, a ticket record dataset associated with the unique project identifier based on receipt of a request from a first client device, wherein the request comprises the unique project identifier, a requesting timeframe, and a requesting skill identifier, wherein the requesting timeframe does not exceed the project timeframe. The method comprises identifying, by the server, the worker profile dataset within the database, wherein the worker skill identifier within the worker profile dataset corresponds to the requesting skill identifier and the requesting timeframe corresponds to an open slot in a work schedule within the worker profile dataset. The method comprises generating, by the server, a recommendation message, wherein the recommendation message comprises a recommendation of assignment of the unique worker identifier to the unique project identifier. The method comprises transmitting, by the server, the recommendation message to a second client device. The method comprises receiving, by the server, an assignment request from the second client device, wherein the assignment request corresponds to the recommendation message. The method comprises modifying, by the server, the worker profile dataset by associating the unique worker identifier with the unique project identifier. The method comprises generating, by the server, a report graphically relating the worker profile dataset with the project profile dataset. The method further comprises transmitting, by the server, the report to the second client device.

In another embodiment, a computer system comprises a server, which is configured to generate a worker profile dataset comprising a unique worker identifier, a worker skill identifier, and a worker work schedule. The server is configured to generate a first instruction to store the worker profile dataset. The server is configured to transmit the first instruction to a database. The server is configured to generate a project profile dataset comprising a unique project identifier, a project timeframe, and a project desired skill identifier. The server is configured to generate a second instruction to store the project profile dataset. The server is configured to transmit the second instruction to a database. The server is configured to generate a ticket record dataset associated with the unique project identifier based on receipt of a request from a first client device, wherein the request comprises the unique project identifier, a requesting timeframe, and a requesting skill identifier, wherein the requesting timeframe does not exceed the project timeframe. The server is configured to identify the worker profile dataset within the database, wherein the worker skill identifier within the worker profile dataset corresponds to the requesting skill identifier and the requesting timeframe corresponds to an open slot in a work schedule within the worker profile dataset. The server is configured to generate a recommendation message, wherein the recommendation message comprises a recommendation of assignment of the unique worker identifier to the unique project identifier. The server is configured to transmit the recommendation message to a second client device. The server is configured to receive an assignment request from the second client device, wherein the assignment request corresponds to the recommendation message. The server is configured to modify the worker profile dataset by associating the unique worker identifier with the unique project identifier. The server is configured to generate a report graphically relating the worker profile dataset with the project profile dataset. The server is further configured to transmit the report to the second client device.

In another embodiment, a method comprises transmitting, by a server, a first set of processor-executable instructions to a first client device over a network, wherein the first set of processor-executable instructions is configured to instruct the first client device to display a first network page on a first network browser, wherein the first network page is configured to receive input comprising a unique project identifier, a requesting timeframe, and a requesting skill identifier. The method comprises receiving, by the server, the input from the first client device over the network. The method comprises transmitting, by the server, a second set of processor-executable instructions to a second client device over the network, wherein the second set of processor-executable instructions is configured to instruct the second client device to present a second network page on a second network browser, wherein the second network page is configured to display a project icon, the unique project identifier associated with the project icon, the requesting timeframe, the requesting skill identifier, and a dynamically updated list of workers available based on a worker skill match with the requesting skill identifier and based on a worker time availability within the requesting timeframe, wherein each of the workers of the dynamically updated list comprises a unique worker identifier and a worker icon. The method comprises assigning, by the server, a unique worker identifier to the unique project identifier based on a drag-and-drop gesture on the second network page in the second network browser displayed on the second client device, wherein the drag-and-drop gesture comprises dragging the worker icon from the dynamically updated list of workers toward the project icon. The method comprises dynamically adjusting, by the server, the dynamically updated list of workers based on the assigning. The method comprises updating, by the server, the second network page on the second network browser via the second client device over the network such that the worker icon is visually associated with the project icon.

In another embodiment, a computer system comprises a server, which is configured to transmit a first set of processor-executable instructions to a first client device over a network, wherein the first set of processor-executable instructions is configured to instruct the first client device to display a first network page on a first network browser, wherein the first network page is configured to receive input comprising a unique project identifier, a requesting timeframe, and a requesting skill identifier. The server is configured to receive the input from the first client device over the network. The server is configured to transmit a second set of processor-executable instructions to a second client device over the network, wherein the second set of processor-executable instructions is configured to instruct the second client device to present a second network page on a second network browser, wherein the second network page is configured to display a project icon, the unique project identifier associated with the project icon, the requesting timeframe, the requesting skill identifier, and a dynamically updated list of workers available based on a worker skill match with the requesting skill identifier and based on a worker time availability within the requesting timeframe, wherein each of the workers of the dynamically updated list comprises a unique worker identifier and a worker icon. The server is configured to assign a unique worker identifier to the unique project identifier based on a drag-and-drop gesture on the second network page in the second network browser displayed on the second client device, wherein the drag-and-drop gesture comprises dragging the worker icon from the dynamically updated list of workers toward the project icon. The server is configured to dynamically adjust the dynamically updated list of workers based on the assigning. The server is further configured to update the second network page on the second network browser via the second client device over the network such that the worker icon is visually associated with the project icon.

Additional features and advantages of various embodiments are set forth in the description which follows, and in part is apparent from the description. Various objectives and other advantages of the present disclosure are realized and attained by various structures particularly pointed out in the exemplary embodiments in the written description and claims hereof as well as the appended drawings. It is to be understood that both the foregoing general description and the following detailed description are exemplary and explanatory and are intended to provide further explanation of the present disclosure as claimed.

BRIEF DESCRIPTION OF DRAWINGS

The accompanying drawings constitute a part of this specification and illustrate an embodiment of the present disclosure and together with the specification, explain the present disclosure.

DETAILED DESCRIPTION

Figure 1:
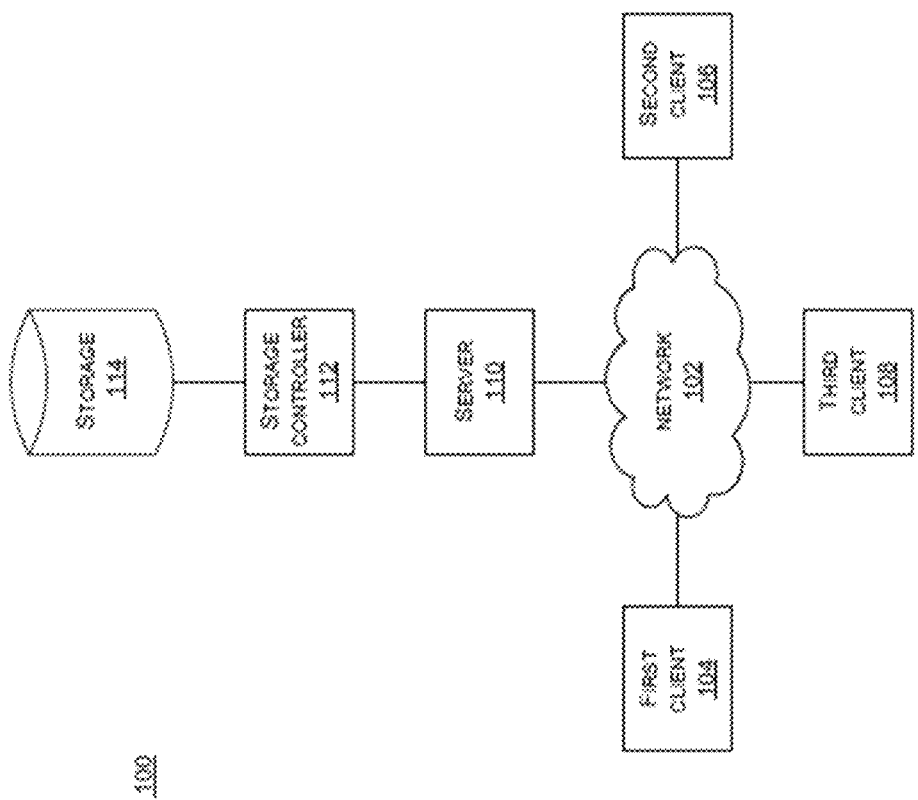
FIG. 1 shows a schematic view of an example embodiment of a network topology according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

In some embodiments, a computer system is configured to enable a network-based management of a worker-to-project allocation, in real-time, based on a receipt of a network-based request from a requesting client for a specific worker skill set for a desired timeframe associated with a project, whether equivalent to or less than the project. The request is processed against a data store of worker profiles, which can be worker-populated, and project profiles, which can be project-manager populated. Each of the worker profiles contains at least a worker identifier, an identified worker skill set, and a work schedule, which may contain an open slot. Each of the project profiles contains a project identifier, a desired project skill set, and a desired timeframe for the desired project skill set. A recommendation engine generates a recommendation based on such processing, such as available worker capacity and desired skills within a requested timeframe. Via a manager client, a manager can accept or ignore the recommendation and assign a worker to a project. The assignment can be via a drag-and-drop gesture involving a worker icon associated with the worker identifier and a project icon associated with the project identifier, with the worker icon being dragged toward the project icon, such as being dropped into a project bucket associated with the project icon.

FIG. 1 shows a schematic view of an example embodiment of a network topology according to the present disclosure. A network topology 100 comprises a network 102, a first client 104, a second client 106, a third client 108, server 110, a data storage controller 112, and a data storage 114. All components of the topology 100 can be coupled directly or indirectly, in a wired or a wireless manner, such as shown in FIG. 1. Note that each of components of the topology 100 can be implemented in logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component. Further, note that at least one of such components can be implemented as a service. Moreover, note that at least two of such components can be hosted on one computing system/hardware/device or each be distinctly hosted.

The topology 100 is based on a distributed network operation model, which allocates tasks/workloads between servers, which provide a resource/service, and clients, which request the resource/service. The servers and the clients illustrate different computers/applications, but in some embodiments, the servers and the clients reside in or are one system/application. Further, in some embodiments, the topology 100 entails allocating a large number of resources to a small number of computers, such as the server 110, where complexity of the clients, such as the clients 104, 106, 108, depends on how much computation is offloaded to the small number of computers, e.g., more computation offloaded from the clients onto the servers leads to lighter clients, such as being more reliant on network sources and less reliant on local computing resources. Note that other computing models are possible as well. For example, such models can comprise decentralized computing, such as peer-to-peer (P2P), for instance Bit-Torrent®, or distributed computing, such as via a computer cluster where a set of networked computers works together such that the computer can be viewed as a single system.

The network 102 includes a plurality of nodes, such as a collection of computers and/or other hardware interconnected via a plurality of communication channels, which allow for sharing of resources and/or information. Such interconnection can be direct and/or indirect. The network 102 can be wired and/or wireless. The network 102 can allow for communication over short and/or long distances, whether encrypted and/or unencrypted. The network 102 can operate via at least one network protocol, such as Ethernet, a Transmission Control Protocol (TCP)/Internet Protocol (IP), and so forth. The network 102 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. The network 102 can be and/or include an intranet and/or an extranet. The network 102 can be and/or include the Internet. The network 102 can include other networks and/or allow for communication with other networks, whether sub-networks and/or distinct networks, whether identical and/or different from the network 102 in structure or operation. The network 102 can include hardware, such as a computer, a network interface card, a repeater, a hub, a bridge, a switch, an extender, an antenna, and/or a firewall, whether hardware based and/or software based. The network 102 can be operated, directly and/or indirectly, by and/or on behalf of one and/or more entities or actors, irrespective of any relation to contents of the present disclosure.

The server 110 can be hardware-based and/or software-based. The server 110 is and/or is hosted on, whether directly and/or indirectly, a server computer, whether stationary or mobile, such as a kiosk, a workstation, a vehicle, marine, or aerial, a desktop, a laptop, a tablet, a mobile phone, a mainframe, a supercomputer, a server farm, and so forth. The server computer can include and/or be a part of another computer system and/or a cloud computing network. The server computer can run any type of operating system (OS), such as MacOS®, Windows®, Android®, Unix®, Linux® and/or others. The server computer can include and/or be coupled to, whether directly and/or indirectly, an input device, such as a mouse, a keyboard, a camera, whether forward-facing and/or back-facing, an accelerometer, a touchscreen, a biometric reader, a clicker, and/or a microphone. The server computer can include and/or be coupled to, whether directly and/or indirectly, an output device, such as a display, a speaker, a headphone, a joystick, a videogame controller, and/or a printer. In some embodiments, the input device and the output device can be embodied in one unit, such as a touch-enabled display, which can be haptic. The server computer can include circuitry for geolocation/global positioning determination, such as via a global positioning system (GPS), a signal triangulation system, and so forth. The server computer can be equipped with near-field-communication (NFC) circuitry. The server computer can host, run, and/or be coupled to, whether directly and/or indirectly, a database, such as a relational database or a non-relational database, such as a post-relational database, an in-memory database, or others, which can feed, avail, or otherwise provide data to at least one of the server 110, whether directly and/or indirectly.

The server 110, via the server computer, can be in communication with the network 102, such as directly and/or indirectly, selectively and/or unselectively, encrypted and/or unencrypted, wired and/or wireless. Such communication can be via a software application, a software module, a mobile app, a browser, a browser extension, an OS, and/or any combination thereof. For example, such communication can be via a common framework/application programming interface (API), such as Hypertext Transfer Protocol Secure (HTTPS).

At least one of the clients 104, 106, 108 can be hardware-based and/or software-based. At least one of the clients 104, 106, 108 is and/or is hosted on, whether directly and/or indirectly, a client computer, whether stationary or mobile, such as a terminal, a kiosk, a workstation, a vehicle, marine, or aerial, a desktop, a laptop, a tablet, a mobile phone, a mainframe, a supercomputer, a server farm, and so forth. The client computer can include and/or be a part of another computer system and/or cloud computing network. The client computer can run any type of OS, such as MacOS®, Windows®, Android®, Unix®, Linux® and/or others. The client computer can include and/or be coupled to an input device, such as a mouse, a keyboard, a camera, whether forward-facing and/or back-facing, an accelerometer, a touchscreen, a biometric reader, a clicker, and/or a microphone, and/or an output device, such as a display, a speaker, a headphone, a joystick, a videogame controller, and/or a printer. In some embodiments, the input device and the output device can be embodied in one unit, such as a touch-enabled display, which can be haptic. The client computer can include circuitry for geolocation/global positioning determination, such as via a GPS, a signal triangulation system, and so forth. The client computer can be equipped with NFC circuitry. The client computer can host, run and/or be coupled to, whether directly and/or indirectly, a database, such as a relational database or a non-relational database, such as a post-relational database, an in-memory database, or others, which can feed or otherwise provide data to at least one of the clients 104, 106, 108, whether directly and/or indirectly.

At least one of the clients 104, 106, 108, via the client computer, is in communication with network 102, such as directly and/or indirectly, selectively and/or unselectively, encrypted and/or unencrypted, wired and/or wireless, via contact and/or contactless. Such communication can be via a software application, a software module, a mobile app, a browser, a browser extension, an OS, and/or any combination thereof. For example, such communication can be via a common framework/API, such as HTTPS. In some embodiments, the server 110 and at least one of the clients 104, 106, 108 can also directly communicate with each other, such as when hosted in one system or when in local proximity to each other, such as via a short range wireless communication protocol, such as infrared or Bluetooth®. Such direct communication can be selective and/or unselective, encrypted and/or unencrypted, wired and/or wireless, via contact and/or contactless. Since many of the clients 104, 106, 108 can initiate sessions with the server 110 relatively simultaneously, in some embodiments, the server 110 employs load-balancing technologies and/or failover technologies for operational efficiency, continuity, and/or redundancy.

In some embodiments, at least one of the clients 104, 106, 108 can be used as a manager terminal, such as a computer with a plurality of input/output devices, such as a keyboard, a mouse, a speaker, a display, a printer, a camera, or others. For example, the manager terminal can be a tablet computer or a workstation computer. The display can output a GUI configured to input or to output information, whether alphanumerical, symbolical, or graphical, to a manager. The input can include various management information for managing the topology 100 and the output can include various statuses of the topology 100. The manager terminal is able to communicate with other components of the topology 100 for maintenance purposes, such as to program or adjust any server, controller, or storage in the topology 100. The GUI can also be configured to present other management or non-management information as well, such as a social network feed. The manager terminal can be configured to print reports, such as in color or grayscale.

The storage controller 112 can include, be a part of, or is a device, which manages a disk drive or other storage, such as flash storage, and presents the disk drive as a logical unit for subsequent access, such as various data input/output (IO) operations, including reading, writing, editing, deleting, updating, searching, selecting, merging, or others. The storage controller 112 can include a front-end side interface to interface with a host adapter of a server and a back-end side interface to interface with a controlled disk storage. The front-end side interface and the back-end side interface can use a common protocol or different protocols. Also, the storage controller 112 can include, be a part of, or is an enterprise controller, which can comprise a physically independent enclosure, such as a disk array of a storage area network or a network-attached storage server. For example, the storage controller 112 can include, be a part of, or is a redundant array of independent disks (RAID) controller. In some embodiments, the storage controller 112 can be lacking such that a storage can be directly accessed by the server 110. In some embodiments, the controller 122 can be unitary with the server 110.

The storage 114 can include, be a part of, or is a storage medium, such as at least one of a data repository, a data mart, or a data store. For example, the storage medium is a database, such as a relational database, a non-relational database, an in-memory database, or others, which can store data and allow access to such data to a storage controller, whether directly and/or indirectly, whether in a raw state, a formatted state, an organized stated, or any other accessible state. The storage 114 can include, be a part of, or is any type of storage, such as primary storage, secondary storage, tertiary storage, off-line storage, volatile storage, non-volatile storage, semiconductor storage, magnetic storage, optical storage, flash storage, hard disk drive storage, floppy disk drive, magnetic tape, or other data storage medium. The storage 114 is configured for various data I/O operations, including reading, writing, editing, deleting, updating, searching, selecting, merging, or others. Note that the storage 114 can be unitary with the storage controller 112. Note that storage 114 can be unitary with the server 110.

Figure 2:
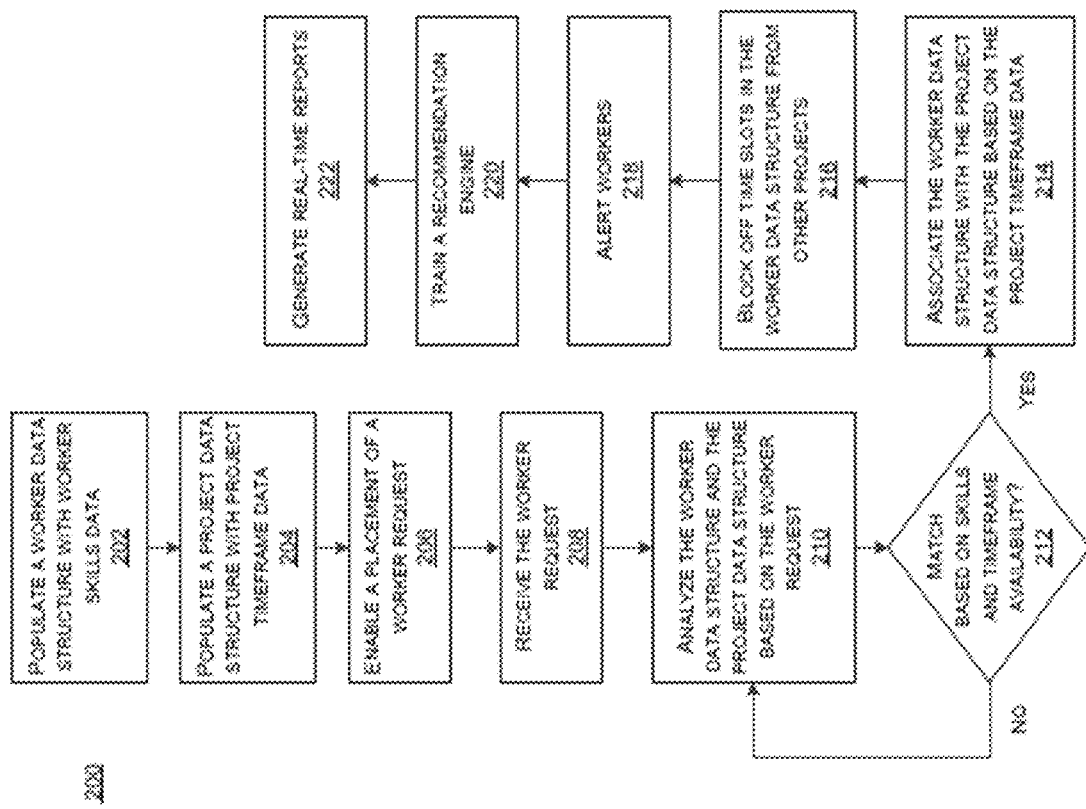
FIG. 2 shows a flowchart of an example embodiment of a process for resource demand assignment, allocation, and management according to the present disclosure.

FIG. 2 shows a flowchart of an example embodiment of a process for misrepresentation detection according to the present disclosure. A process 200 includes a plurality of blocks 202-222. The process 200 is at least partially performed using the topology 100 of FIG. 1. A person skilled in the relevant art will appreciate that the terms "client" and "client device" are interchangeably used throughout the present disclosure and both refer to one or more of the client devices in FIG. 1. Furthermore, the term "client" or "client device" refers to one or more client devices as described in FIG. 1. For example, certain actions may be performed by the first client device and certain other actions may be performed by the second client device. In addition, in some embodiments, all the actions may be performed by the same client device. In block 202, a worker profile dataset is populated or generated, by the server (e.g., the server in FIG. 1), with worker skills data. The worker profile dataset, such as a file, may be stored in a storage, such as a database. The server may generate an instruction to store the worker profile dataset and transmit the instruction to a database associated with the server or the worker. For example, the worker profile dataset comprises a worker profile dataset. The worker profile dataset can be embodied as, be a part of, or include a matrix, a queue, an array, a stack, a deck, a linked list, a table, a tree, or another other data structure. The worker profile dataset comprises data associated with a worked, which is received via a server or a client, such as a manager client, and generated via the server or the client or another client, such as via a worker client. The worker data is inputted via any input method via any input device, such as mouse, keyboard, camera, microphone, touchpad, track pad, touch display, haptic device, or others. For example, the receipt can occur via data entry through a keyboard or a mouse or a microphone.

The worker profile dataset can comprise personal information, such as first and last name, nickname, preferred name, age, gender, residential address, phone number, email address, hobby, family information, social network service identifier, or any other personal information. The worker profile dataset can also comprise organizational information, such as a unique worker identifier, organizational segment, organizational position, organizational address/location, organization phone number, organizational email, organizational social network service identifier, or any other organizational information.

The unique worker identifier can be any symbolic, alphanumeric, graphical, audio, video, tactile data, or any other type of data. The unique worker identifier can be a first name, a last name, a preferred name, a nickname, a random string, an auto-generated number, an icon, a photo, a video, a set of worker provided numbers, at least a part of a social security number, or any other unique informational identifier, whether worker or organization provided. Note that when a first name and last name or initials thereof are used and conflict with a preexisting identifier, then another identifier can be appended or combined in any manner. For example, if a worker is John Smith and a profile of another John Smith already exists, then John Smith 1 or JS1 or J1 or 51 or SJ or JS2015 or 1970J5 can be used, where such numbers can be randomly generated or be part of the worker profile, such as current year, birth year, dates, organization join year, or any other alphanumerical, symbolic, or pictorial nomenclature.

The worker skills data is information about skills worker is tested for, reputed, or alleged to possess, such as programming skills, information technology skills, accounting skills, legal skills, medical skills, repair skills, foreign languages, sign languages, educational credentials, security clearance, or any other life or educational experience or credential that a worker alleges to possess in any level of specificity, including subsets. For example, in a context of programming skills, a worker skill can be as general as a C++ programming skill or a subset of such skill, such as a knowledge of objects in C++. Each of the worker skills data can be ranked, rated, or reviewed in any scale or in any manner, such as a 1-5 or a 1-10 scale, a binary scale, a Likert scale, a sliding scale, a star scale, an alphanumeric sentence paragraph, or a happy/sad face. Such ranking, rating, or review can be by the worker or others who have worked or have any experience with the worker, whether for a specific skill or generally, such as co-workers, supervisors, or others in any organizational level. For example, in a context of accounting skills, a worker skill can be financial auditing of midsize companies with a rating of 7 on a sliding scale as rated by at least one co-worker or a supervisor review of "This worker really knows financial auditing." Such ranking, rating, or review can be obtained from a social network service as well, such as LinkedIn®. The worker skills data can be automatically populated from a resume file submitted by the worker, an educational verification network-based service, a governmental service, or from a social network service profile, such as a LinkedIn® profile. The worker skills data includes at least one of symbolic, alphanumeric, graphical, audio, video, or any other type of data. Each of the worker skills data can be identified via a worker skill identifier, such as a skill name, an abridged string, a random string, a standardized alphanumeric string, a picture, a video, or any other unique informational identifier, whether worker or organization provided. For example, in a context of foreign languages, a speaking ability in Russian can be identified as RLSA or 613.

The server may also receive the worker data from an employee's schedule, whether manually entered or maintained by the worker co-worker or supervisor. Additionally or alternatively, such population of data can also be from a groupware calendar data source, such as Microsoft Exchange® or Microsoft SharePoint®. The worker work schedule can contain one or more open time slots, which are dynamically updated via a network-source.

In block 204, the server may generate a project profile dataset comprising project timeframe data. The project profile dataset, such as a file, is stored in a storage, such as a database. The server may generate an instruction to store the worker project dataset and transmit the instruction to a database associated with the server or the worker. For example, the project profile dataset comprises a project profile. The project profile dataset can be embodied as, be a part of, or include a matrix, a queue, an array, a stack, a deck, a linked list, a table, a tree, or another other data structure. The project profile dataset may be generated via the server based on the data received from a client device associated with a manager client. The server may receive the data via any input method via any input device, such as mouse, keyboard, camera, microphone, touchpad, track pad, touch display, haptic device, or others. For example, the population can occur via data entry through a keyboard or a mouse or a microphone.

The project profile dataset can comprise project information, such as unique project identifier, project name, project organizational unit, project scope, project goal/objective, project location, project duration, project timeframe, project leader, project requestor, project equipment, desired worker skill, project contact information, project social network service page, or any other project information.

The unique project identifier can be any symbolic, alphanumeric, graphical, audio, video, tactile data, or any other type of data. The unique project identifier can be a project name, a preferred project name, a project nickname, a random string, an auto-generated number, an icon, a photo, a video, a set of project manager provided numbers, or any other unique informational identifier, whether standardized or not. For project identifier conflict management, various techniques as described herein with respect to worker identifier conflict management can be used. For example, if a project title is Write Patents and a profile of another project Write Patents already exists, then Write Patents1 or WP1 or W1 or P1 or PW or WP2015 or 1970PW can be used, where such numbers can be randomly generated or not, such as current year, project birth year, or any other alphanumerical, symbolic, or pictorial nomenclature.

The desired worker skill data is information about worker skills desired for a particular project, such as programming skills, information technology skills, accounting skills, legal skills, medical skills, repair skills, foreign languages, sign languages, educational credentials, security clearance, or any other life or educational experience or credential that a worker would be tested, reputed, or alleged to possess in any level of specificity, including subsets. For example, in a context of programming skills, a desired worker skill can be as general as a C++ programming skill or a subset of such skill, such as a knowledge of objects in C++. Each of the desired worker skills data can be ranked, rated, or reviewed in any scale or in any manner, such as a 1-5 or a 1-10 scale, a binary scale, a Likert scale, a sliding scale, a star scale, an alphanumeric sentence paragraph, or a happy/sad face. Such ranking, rating, or review can be set by a project manager via a client. Such ranking, rating, or review can be given weight for assignment recommendations or higher placement in recommendation results. For example, in a context of accounting skills, a desired worker skill can be financial auditing of midsize companies with a rating of 7 on a sliding scale as set by a project manager or a supervisor review of "This worker is an expert in financial auditing." Such ranking, rating, or review can be obtained from a social network service as well, such as LinkedIn®, such as based on what others believe are desired skills for a particular project. The desired worker skills data can be automatically populated from a requirements or a business plan file submitted by the project manager, an accepted publication in a field to which the project relates to, or a governmental service. The desired worker skills data includes at least one of symbolic, alphanumeric, graphical, audio, video, or any other type of data. Each of the desired worker skills data can be identified via a desired worker skill identifier, such as a skill name, an abridged string, a random string, a standardized alphanumeric string, a picture, a video, or any other unique informational identifier, whether project manager or organization provided. For example, in a context of foreign languages, a speaking ability in Russian can be identified as RLSA or 613.

The server may receive the data associated with the project profile dataset from a project timeframe, such as via being manually entered or maintained by the worker, co-worker, or supervisor. Additionally or alternatively, such population of data can also be from a network-based groupware calendar data source, such as Microsoft Exchange® or Microsoft SharePoint®. The project timeframe can span an entire time anticipated for the project or a portion of the entire time anticipated for the project. For example, the project timeframe can be 3 days, where such time period corresponds to the anticipated time for the entire project or where such time period is a portion of the project if the project is scheduled to run longer, such as 4 or more days. Note that the project timeframe can be set in any units of time, whether based on a calendar nomenclature, fiscal nomenclature, business day nomenclature, or any other nomenclature, such as years, quarters, months, weeks, days, hours, minutes, or seconds.

In block 206, a placement of a worker request is enabled. Such enablement occurs via a server-based presentation of a network page on a network browser on a client device over a network. For example, the network page can comprise a web page or a dedicated application graphical user interface page. For example, the network page can comprise a plurality of fields, such as a form for population to generate the worker request. The network page can be populated by a project manager who would input into the network page the worker request requesting a worker with a specific set of skills for a specific time period for a specific project. For example, the worker request can comprise a request name, a contact name, an initiating organizational area, who is driving the worker request, alphanumeric textual detailed description of the worker request, an escalation information, a project funding information, a project manager name, an additional sign-off information, an additional consideration information, the unique project identifier, a requesting timeframe, and a requesting skill identifier, where the requesting timeframe does not exceed the project timeframe, or any other worker request relevant information. The worker request can be submitted or cancelled via the network page. In some embodiments, the network page can comprise a tabbed graphical user interface, where each of the tabs corresponds to a specific information area. For example, the tabbed graphical user interface can be server-generated and then sent to the client or the tabbed graphical user interface can be client-generated but populated from the server. For example, the worker request can be sourced from a network page form presented in a network page browser on a requesting client, where the network page form comprises a business segment graphical control element and a request reason graphical control element, wherein the request is based on an input into the business segment graphical control element and an input into the request reason graphical control element. For example, a network page form comprises an escalation graphical control element and an escalation reason graphical control element, where the request is based on an input into the escalation graphical control element and an input into the escalation reason graphical control element. For example, a worker request can be sourced from a network page presented in a network page browser on the requesting client, where the network page comprises a graphical user interface tab with an impacted business segment graphical control element, where the request is based on an input into the impacted business segment graphical control element. For example, a server can provide a requestor dashboard to a requestor client over a network, where the requestor dashboard receives the worker request. In block 208, the worker request is received by the server. In an embodiment, the server receives the request from the client device as result of the user operating the client device, submitting the request or otherwise causing the request to be submitted to the server.

In block 210, the worker profile dataset and the project profile dataset are analyzed, by the server, based on the worker request. Such analysis may comprise generation of a ticket record dataset in a storage, such as the database used to store the worker profile dataset and the project profile dataset. The ticket record dataset can be embodied as, be a part of, or include a matrix, a queue, an array, a stack, a deck, a linked list, a table, a tree, or another other data structure or dataset. The ticket record dataset is generated via a server based on received data (e.g., population). The receipt of the data may occur via any input method via any input device, such as mouse, keyboard, camera, microphone, touchpad, track pad, touch display, haptic device, or others. For example, the receipt can occur via data entry through a keyboard or a mouse or a microphone. The receipt can also be automatic, such as server-based. The data received may include information related to the ticket record dataset, such as relevant project profile dataset information, such as the unique project identifier, the project timeframe data, the desired worker skills identifier, or any other relevant information. The ticket record dataset is associated with the unique project identifier based on a receipt of the worker request from a requesting client over a network.

Such analysis further comprises server-based searching, based on the generating of the ticket record dataset, the storage for a worker profile dataset based on a match between a worker skill identifier in the worker profile dataset and a requesting skill identifier in the worker request and based on a requesting timeframe within the worker request being within an open slot in the worker work schedule of the worker profile dataset, such as automatically maintained via a network-based groupware calendar data source, such as Microsoft Exchange® or Microsoft SharePoint®. The search can be of any type, such as via a built-in search function, a fuzzy searching, or any other type of search. Searching can involve a heuristic pattern recognition. For example, the heuristic pattern recognition can be based on a Bayesian approach. For example, upon generating the ticket record dataset, the server searches various worker profiles stored in the storage for a worker profile, which has a worker skill identifier therein, such as RLSA, matching a requesting skill identifier, such as RLSA, from a worker request. Upon a skill set match, the server then searches the skill matching profiles, such as a subset of the various worker profiles stored in the storage, for time availability via one or more open slots in the skill matching profiles based on the requesting timeframe being within the one or more open slots in a worker work schedule of the skill matching profiles. For example, if the storage stores profiles A, B, C, D and the matching skill search returns profiles A, B, then the time availability search searches profiles A, B for an open slot in the schedules of profiles A, B. For example, a worker profile with more open slots or more continuous open slots or larger open slots can be preferred over a worker profile with less open slots or less continuous open slots or smaller open slots. In some embodiments, such order is reversed, where the server performs the time availability search for worker profiles and then performs the skill matching search based on the search results from the time availability search.

In block 212, a determination is made, by the server, if there is a worker profile dataset match to a worker request, where the match is based on worker skills and worker timeframe availability. If there is a match, then block 214 is performed. If there is no match, then block 210 is performed by the server. For example, if there is a match based on a server identifying one or more worker profile datasets based on the searching, then the server reads one or more unique worker identifiers from the one or more worker profile datasets based on the identifying.

In block 214, the worker profile dataset is associated, by the server, with the project profile dataset based on the project timeframe data. Such association can be via a reference, a pointer, a flag, or any other means of associating such as generating a value within a dataset associated with the worker, where the value indicates the association. Such association can be manual, such as via a client operating an input device, such as a keyboard or a mouse. Such association can be automatic, such as via a set of rules or a heuristic. Such association can be based on a server-based generation of a recommendation message based on the reading and identifying the one or more unique worker identifiers. The recommendation message recommends an assignment of the unique worker identifier to the unique project identifier. In some embodiments, the recommendation message may recommend to assign the worker profile dataset to the project profile dataset. In other words, the recommendation message may recommend an employee associated with the worker profile dataset to be utilized for the project associated with the project profile dataset. In an alternative embodiment, the recommendation message can also recommend a team comprising the worker associated with the unique worker identifier. For example, more than one worker, whether from one department or many departments, can be recommended, such as a team or a plurality of workers who are commonly assigned together based on complementary skills or prior reviews or ratings. In some embodiments, when the worker skill identifier is associated with a weight based on experience, then the recommendation engine can use such weight. For example, more experienced workers are more recommended or placed higher in a recommendation list based on the weight. For example, the recommendation engine can be configured to factor in history of assignment based on the associating such that the recommendation is able to predict based on a real-time trend or a history.

The recommendation message can be generated via a recommendation engine running on the server, which trains and learns from past and present assignments, in real-time. The server can send the recommendation message to a client device, such as assigning client, over a network, where a user of the client device could elect to follow the recommendation message or ignore the recommendation message. In response to receiving the recommendation message, the client operating the client device can place an assignment request over the network. For example, if the user elects to follow the recommendation message, then the user can drag-and-drop a worker icon associated with the unique worker identifier to a project icon associated with the unique project identifier, where such gesture would associate the worker profile dataset with the project profile dataset. Also, for example, the user can elect to follow the recommendation message by clicking a button on a graphical user interface (generated and displayed on the client computing device by the server) to accept the recommendation message and thereby associate the worker profile dataset with the project profile dataset. Therefore, the assignment request is user generated. For example, the assignment request can be placed via a server providing an assigning dashboard to the assigning client over the network, where the assigning dashboard presents a recommendation message and submits the assignment request.

For example, a server can be configured to send a first set of processor-executable instructions to a first client over a network, where the first set of processor-executable instructions is configured to instruct the first client to present a first network page on a first network browser, where the first network page is configured to receive a requestor input comprising a unique project identifier, a requesting timeframe, and a requesting skill identifier. The server can be configured to receive the requestor input from the first client over the network. The server can be configured to send a second set of processor-executable instructions to a second client over the network, where the second set of processor-executable instructions is configured to instruct the second client to present a second network page on a second network browser, where the second network page is configured to present a project icon, the unique project identifier associated with the project icon, the requesting timeframe, the requesting skill identifier, and a dynamically updated list of workers available based on a skill match with the requesting skill identifier and based on a time availability within the requesting timeframe, as disclosed herein, where each of the workers of the dynamically updated list comprises a unique worker identifier and a worker icon. The server can be configured to assign a unique worker identifier to the unique project identifier based on a drag-and-drop gesture on the second network page in the second network browser presented via the second client, where the drag-and-drop gesture comprises dragging the worker icon from the dynamically updated list of workers toward the project icon. The server can be configured to dynamically adjust in real-time the dynamically updated list of workers based such assignment. The server can be configured to update the second network page on the second network browser via the second client over the network such that the worker icon is visually associated with the project icon.

In block 216, based on associating the worker profile dataset with the project profile dataset, one or more open slots in a schedule associated with the worker profile dataset, such as via a unique worker identifier, are automatically blocked off or reserved or hidden or made visually distinct from other workers projects or projects requests, such as to avoid overbooking or scheduling conflicts. A person skilled in the relevant art will appreciate that the server may generate or modify an existing dataset associated with the worker in order to accomplish the above-mentioned task.

In block 218, an alert is sent, by the server, to a client, such as a client associated with the worker profile dataset or a client who placed the worker request. The alert is server-generated and alerts of an association of the worker profile dataset to the project profile dataset based on the worker request. The alert can comprise any alphanumerical, audio, video, or any information type. The alert can be sent in a wired or wireless manner, whether directly or indirectly, whether encrypted or unencrypted. For example, the alert can comprise an email message, a chat message, a social network service message, a fax, a physical letter, a phone call, or any other communication medium.

In block 220, a recommendation engine learns/trains from the association so that any patterns or preferences can be taken into consideration when generating new recommendation messages.

In block 222, one or more reports can be generated. The one or more reports can be updated in real-time. The one or more reports can be availed or sent, by the server, to a client, as disclosed herein. The one or more reports can comprise any graphical information visually informative of the worker profile dataset being associated with the project profile dataset or any information informative of any associating patterns or trends.

In some embodiments, for efficiency purposes, the server can be used to manage utilization of the worker profile datasets such that an underutilization message can be generated and communicated to a client over a network. The underutilization message can be informative of an underutilization of a worker associated with the unique worker identifier. The one or more reports can report on or be based on the underutilization message. For example, the underutilization message can be informative that a worker associated with the unique worker identifier is utilized 3 out of 8 hours on a daily basis over last 3 months or that a worker associated with the unique worker identifier is an expert in Java and that expertise has not been utilized over last 6 months. Similarly, for efficiency purposes, the server can be used to manage utilization of the worker profile datasets such that an over-utilization message can be generated and communicated to a client over a network. The over-utilization message can be informative of an over-utilization of a worker associated with the unique worker identifier. The one or more reports can report on or be based on the over-utilization message. For example, the over-utilization message can be informative that a worker associated with the unique worker identifier is over-utilized 7 out of 8 hours on a daily basis over last 2. For example, a server can generate and provide a Gantt chart to an assigning client over a network, wherein the Gantt chart depicts worker utilization associated with the unique worker identifier, whether under, properly, or overly utilized.

In some embodiments, a client receiving a recommendation message for assignment can display a request worker queue with a request worker numerical count received and updated from the server in real-time. For example, the request numerical count can be 50 worker requests pending. The request worker numerical count counts based on each requested association, e.g., a received worker request. The request worker numerical count can be incremented by a single value, such as if the request counter is 459 after 459 worker request, then a next worker request is 460 and the counter is accordingly incremented by 1 to 460. The request worker numerical count can comprise or be based on a loop counter, such as a for loop, a value, a flag, or a variable. The request worker numerical count can be a loop counter, such as a count-controlled loop, a condition-controlled loop, a collection-controlled loop, a while loop, a for loop, or other successive sequence of computer statements. The request count accesses or keeps a count of worker requests such that the request count can be compared to a threshold to determine if the threshold is reached or exceeded, where the threshold represents a significant or critical amount of requests of an assignor client or server to handle over a predetermined time period. For example, if 300 requests are received for assignment within 1 minute, then the threshold can be passed and redundancy or back up computing activated, such as other clients or servers. Note that some worker requests can be time-sensitive or critical and can be associated with a predetermined time period to fulfill or assign. For example, a worker request can be time-sensitive to be fulfilled under 1 minute, where the worker request should be fulfilled under 1 minute or a requesting client or another client is notified if such assigning cannot be met in such time period.

In some embodiments, a server or a client is configured to track an amount of time spent by a user of a client placing or preparing or assigning a worker request, where the amount of time is counted toward the project timeframe, such as for precision or efficiency purposes. Such tracking is from opening a network page to generate or place or assign the worker request until closing of the worker request or the network page. Note that if such network page is opened and closed and reopened, time tracking occurs for each time period the network page is open. Further, such time tracking can occur for each time period the network page is open and the user is detected to be present in front of the client, such as via a use of an input device, such as a keyboard, a mouse, a microphone, a camera, a touch display, or others. Also, as such time is tracked and counted toward the project timeframe, the server can dynamically adjust, in real-time, the project timeframe in the project data structure such that clients in communication with the server can display in real-time such adjustments. For example, the project timeframe can be visibly adjusted in real-time based on the time tracking for at least one of a requesting client or a assigning client.

In some embodiments, a client or a server can be configured to reverse block 214. For example, such reversal can occur via disassociating, by the server, the unique worker identifier from the unique project identifier based on a disassociation request received from at least one of a requesting client or assigning client over the network. Such disassociating can be via a same graphical user interface as used during associating. The server can reflect such disassociating in real-time. Further, such disassociation can occur via a drag-and-drop gesture on at least one of a requesting client or a assigning client, where such drag-and-drop gesture involves dragging a worker icon from a project icon, such as from a project bucket, toward a list of unique worker identifiers, which can be dynamically updated in real-time.

Figure 3:
FIG. 3 shows a screenshot of an example embodiment of a graphical user interface page for a request intake according to the present disclosure.

FIG. 3 shows a screenshot of an example embodiment of a graphical user interface page for a request intake according to the present disclosure. The request intake occurs via a server-based presentation of a network page on a network browser on a client device over a network. As shown, the network page can comprise a web page or a dedicated application graphical user interface page. The network page comprises a plurality of fields, such as a form for population to generate the worker request. The network page can be populated by a project manager, operating the client device, who would input into the network page the worker request requesting a worker with a specific set of skills for a specific time period for a specific project. The worker request can comprise a request name, a contact name, an initiating organizational area, who is driving the worker request, alphanumeric textual detailed description of the worker request, an escalation information, a project funding information, a project manager name, an additional sign-off information, an additional consideration information, the unique project identifier, a requesting timeframe, and a requesting skill identifier, where the requesting timeframe does not exceed the project timeframe, or any other worker request relevant information. The worker request can be submitted or cancelled via the network page. The network page comprises a tabbed graphical user interface, where each of the tabs corresponds to a specific information area. For example, the tabbed graphical user interface can be server-generated and then sent to the client or the tabbed graphical user interface can be client-generated but populated from the server. For example, the worker request can be sourced from a network page form presented in a network page browser on a requesting client device, where the network page form comprises a business segment graphical control element and a request reason graphical control element, wherein the request is based on an input into the business segment graphical control element and an input into the request reason graphical control element. For example, a network page form comprises an escalation graphical control element and an escalation reason graphical control element, where the request is based on an input into the escalation graphical control element and an input into the escalation reason graphical control element. For example, a worker request can be sourced from a network page presented in a network page browser on the requesting client, where the network page comprises a graphical user interface tab with an impacted business segment graphical control element, where the request is based on an input into the impacted business segment graphical control element. For example, a server can provide a requestor dashboard to a requestor client over a network, where the requestor dashboard receives the worker request.

Figure 4:
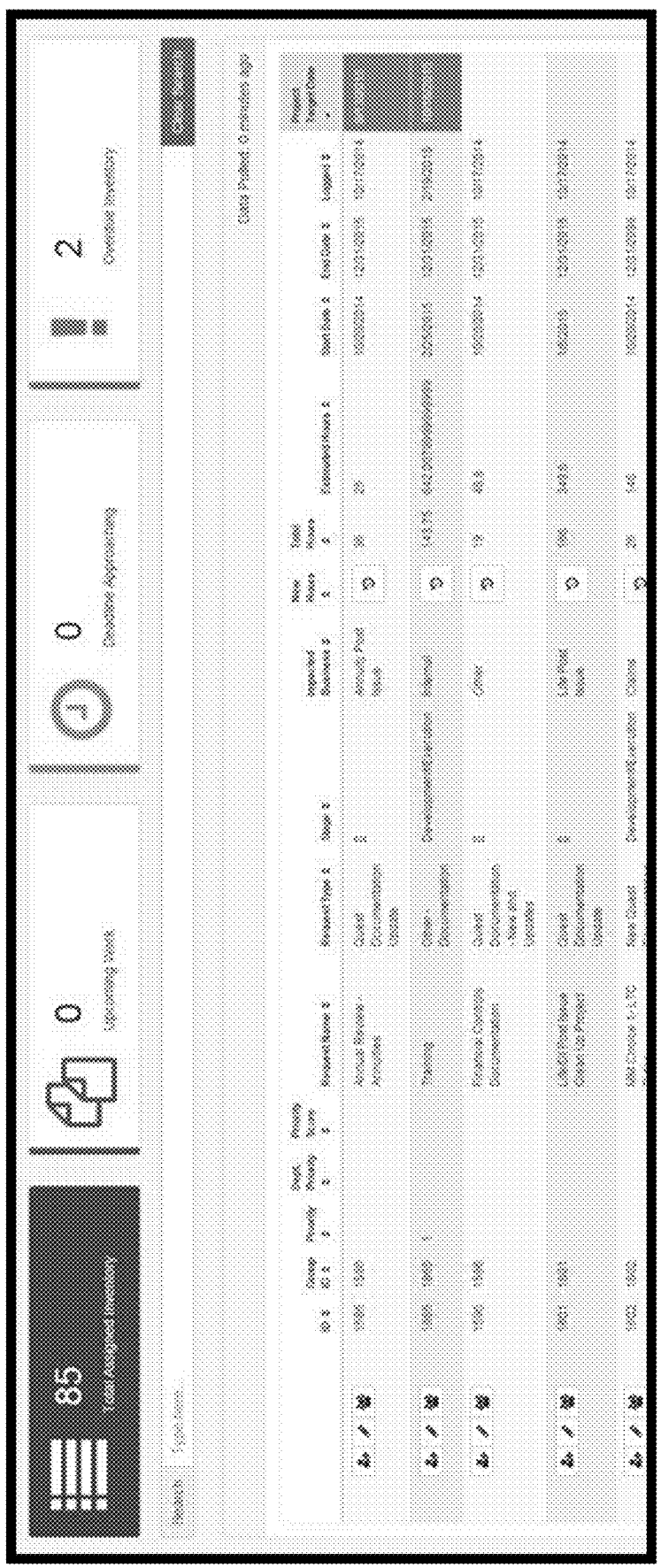
FIG. 4 shows a screenshot of an example embodiment of a graphical user interface page for a request management dashboard according to the present disclosure.

FIG. 4 shows a screenshot of an example embodiment of a graphical user interface page for a request management dashboard according to the present disclosure. The request management dashboard depicts links for an assigned inventory, a team calendar, a total assigned inventory, upcoming work, deadline approaching, and overdue inventory, where the inventory is defined via worker requests. An assignor can access the request management dashboard and select a worker request for processing.

Figure 5:
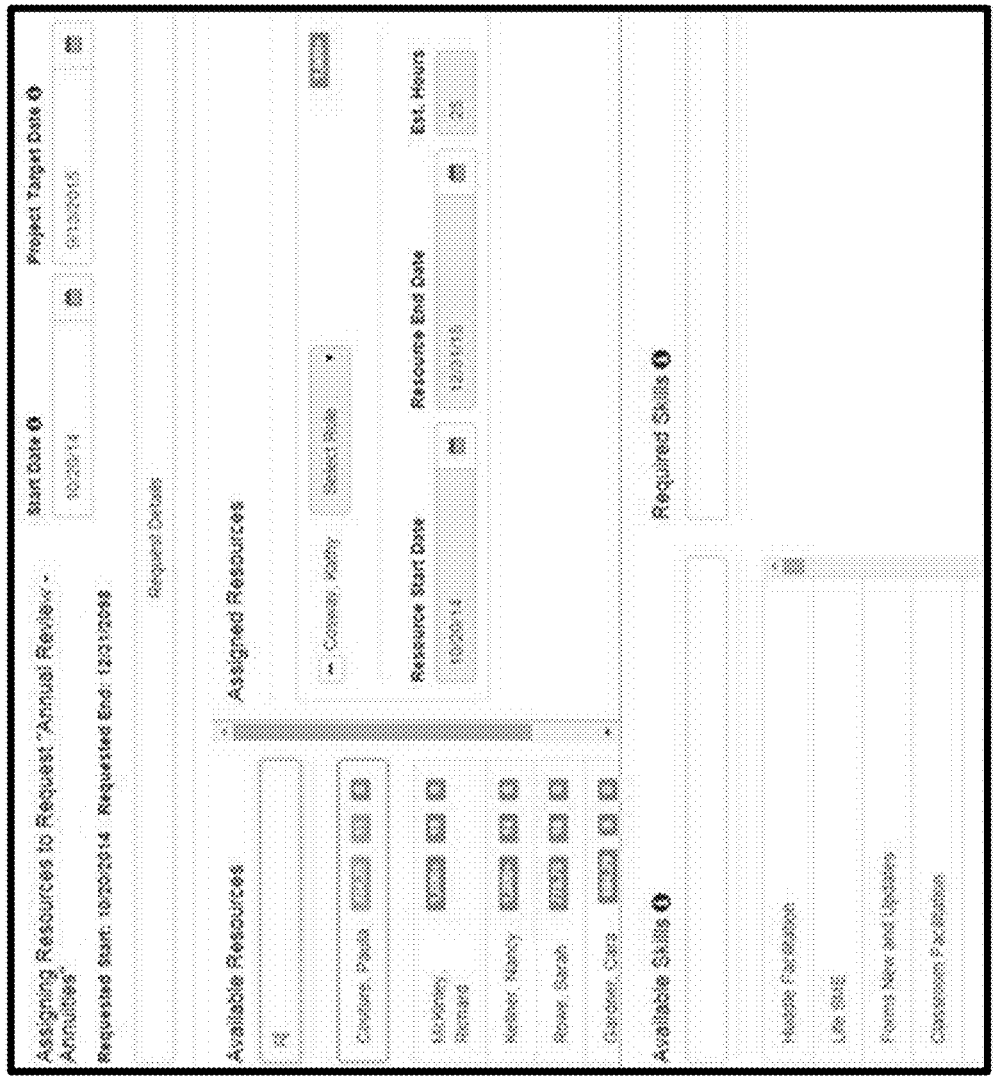
FIG. 5 shows a screenshot of an example embodiment of a graphical user interface page for a request assignment according to the present disclosure.

FIG. 5 shows a screenshot of an example embodiment of a graphical user interface page for a request assignment according to the present disclosure. The graphical user interface page for a request assignment depicts a timeframe start date, a project start date, and a dynamically updated list of workers available based on a skill match with a requesting skill identifier and based on a time availability within a requesting timeframe, where each of the workers of the dynamically updated list comprises a unique worker identifier and a worker icon. The graphical user interface page for a request assignment depicts a selected worker profile for assignment, where the profile comprises a last name, a first name, a role, a worker start date, a worker end date, required skills, and an estimated amount of hours. Each worker icon of the dynamically updated list of workers depicts various hours data, such as in closed shaped polygons, associated with the unique worker identifier corresponding to the worker icon. Such hours data can comprise total hours available, free hours, open hours, weekend hours, holiday hours, number of time slots, over-utilization, underutilization, vacation time, or other time relevant data. Such hours data can be colored or visually distinct from to readily suggest information, such as red being over-utilized, green being underutilized, skill experience, age, or others. Each worker icon of the dynamically updated list of workers can be static or dynamic in real-time. Each worker icon of the dynamically updated list of workers can be made visually distinct to readily suggest information, such as time availability, degree of match level, matching preference, experience, facial picture, or others. Such visual distinctness can be via color or line patterns, such as solid, broken, hybrid, or others. Further, each worker icon of the dynamically updated list of workers can be dynamically presented, such as hidden or shown, based on autocomplete functionality of available skills search form field. For example, typing in a letter P can dynamically present worker icons, based on unique worker identifiers, for workers associated with skill sets that comprise P, such as programming, plumbing, camping, taping, or others that contain P and stored in the storage.

Figure 6:
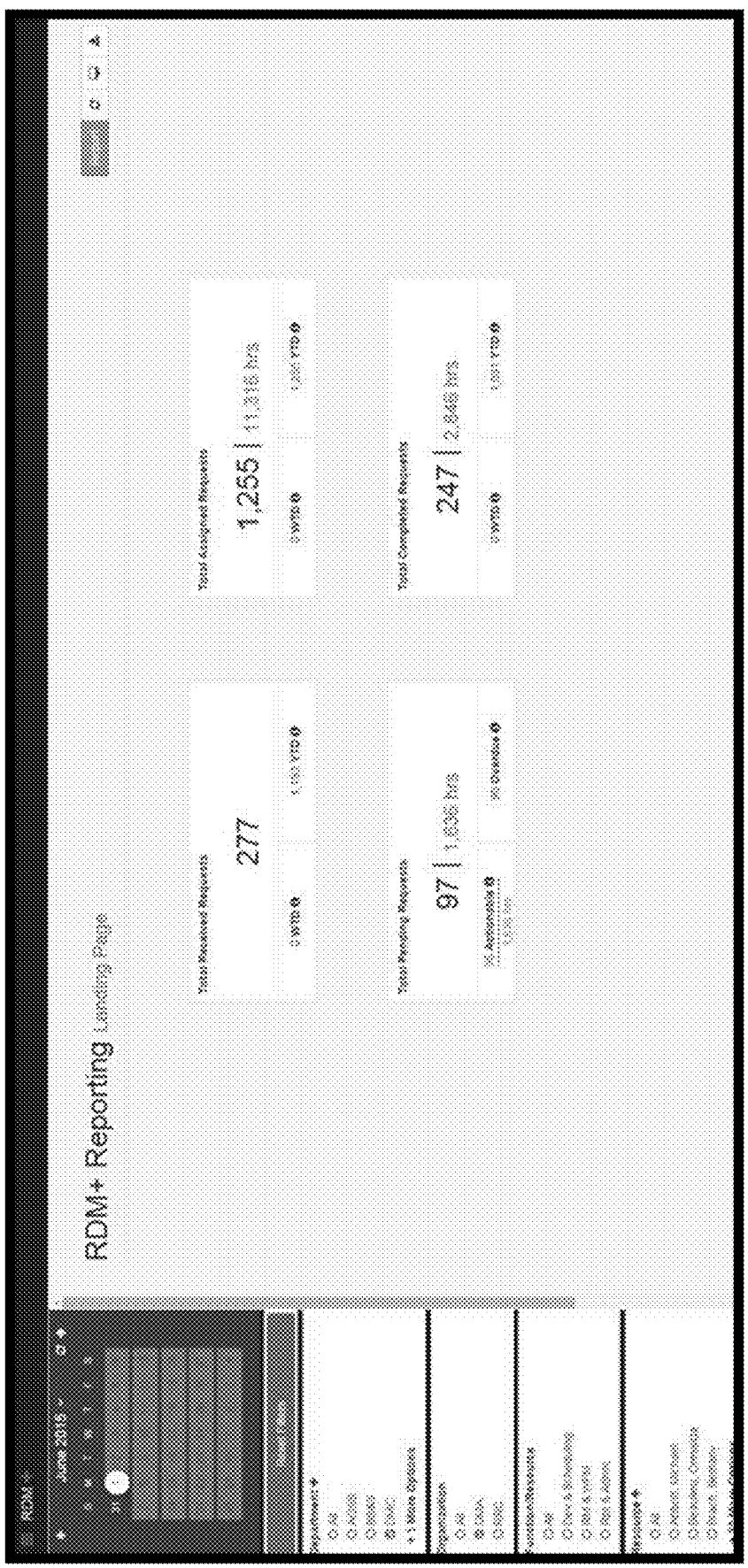
FIG. 6 shows a screenshot of an example embodiment of a graphical user interface page for a request report dashboard according to the present disclosure.

FIG. 6 shows a screenshot of an example embodiment of a graphical user interface page for a request report dashboard according to the present disclosure. The request report dashboard depicts a calendar element, a department filter, an organization filter, and a function/resource filter. Such filters can be used for report generation or filtering. The request report dashboard also shows a number of total received requests element, a total assigned requests element, a total pending requests element, and a total completed requests element. Some of such elements show hours, such as total assigned requests hours, total pending requests hours, and total complete requests hours. Also, some of such elements can depict such information in a week-to-date manner or year-to-date manner.

Figure 7:
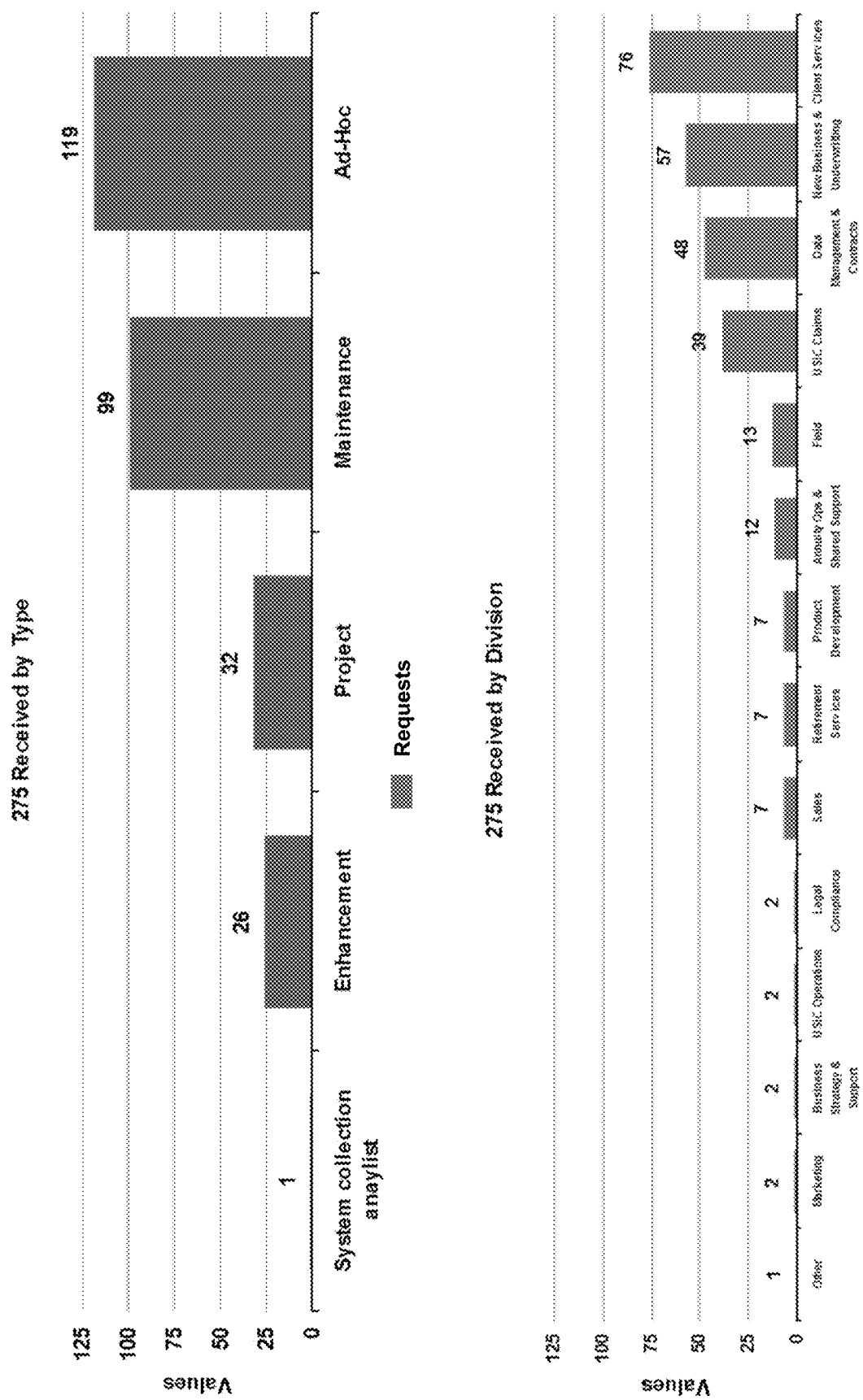
FIG. 7 shows a screenshot of an example embodiment of a graphical user interface page for a received request report according to the present disclosure.

FIG. 7 shows a screenshot of an example embodiment of a graphical user interface page for a received request report according to the present disclosure. The graphical user interface page for a received request report shows various bar graphs for worker requests, where such graphs are grouped by request type, such as ad-hoc, maintenance, project, or enhancement, or by organizational division, such as client services, new business, data management/controls, retirement services, product development, sales, field services, or others.

Figure 8:
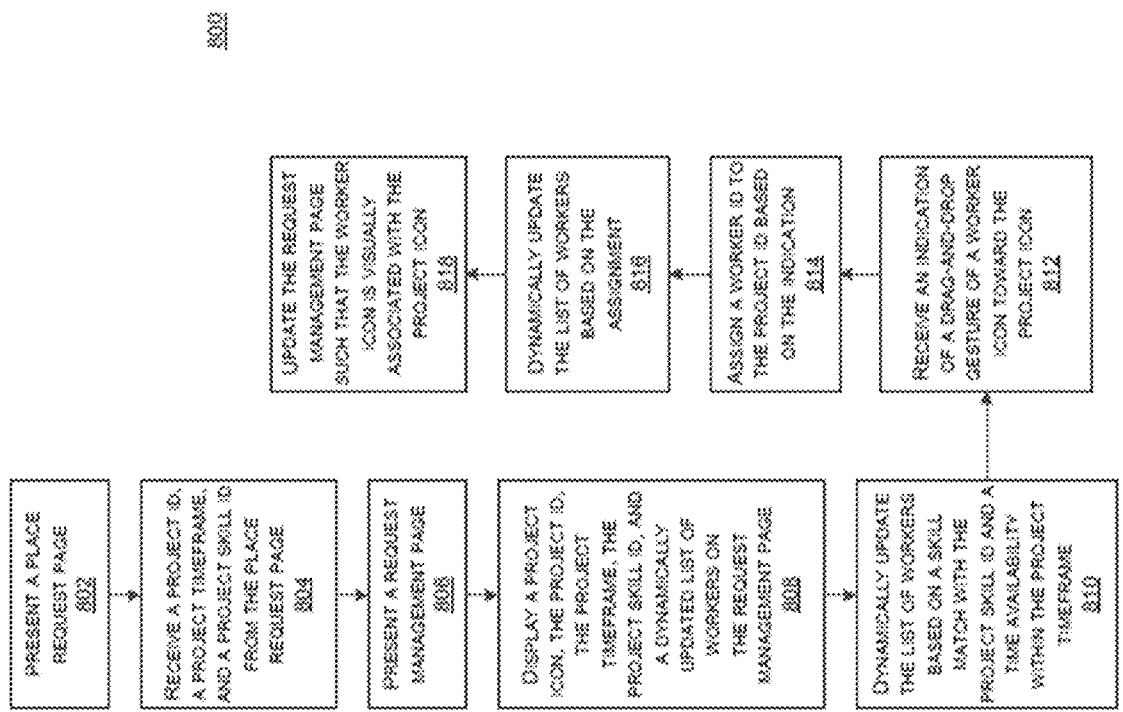
FIG. 8 shows a flowchart of an example embodiment of a process for request assignment based on drag-and-drop gesturing according to the present disclosure.

FIG. 8 shows a flowchart of an example embodiment of a process for request assignment based on drag-and-drop gesturing according to the present disclosure. A process 800 includes a plurality of blocks 802-818. The process 800 is at least partially performed using the topology 100 of FIG. 1 or in context of process 200 or graphical user interfaces or dashboards of FIGS. 3-7. A person skilled in the relevant art will appreciate that the terms "client" and "client device" are interchangeably used throughout the present disclosure and both refer to one or more of the client devices in FIG. 1. Furthermore, the term "client" or "client device" refers to one or more client devices as described in FIG. 1. For example, certain actions may be performed by the first client device and certain other actions may be performed by the second client device. In addition, in some embodiments, all the actions may be performed by the same client device. In block 802, a server (e.g., the server as depicted in FIG. 1) presents a place request page. Such presentation occurs via a network page on a network browser on a client device over a network such as the network depicted in FIG. 1. For example, the network page (e.g., a network browser) can comprise a web page or a dedicated application graphical user interface page. For example, the network page can comprise a plurality of input fields, such as a form for population to generate the worker request. The network page can be populated by a project manager operating a client device who would input into the network page a worker request requesting a worker with a specific set of skills for a specific time period for a specific project. For example, the worker request can comprise a request name, a contact name, an initiating organizational area, who is driving the worker request, alphanumeric textual or pictorial or video or audio detailed description of the worker request, an escalation information, a project funding information, a project manager name, a specific worker name or identifier, an additional sign-off information, an additional consideration information, the unique project identifier, a project timeframe, a requesting timeframe, and a requesting skill identifier, where the requesting timeframe does not exceed the project timeframe, or any other worker request relevant information. The worker request can be submitted or cancelled via the network page. In some embodiments, the network page can comprise a tabbed graphical user interface, where each of the tabs corresponds to a specific information area. For example, the tabbed graphical user interface can be server-generated and then sent to the client device or the tabbed graphical user interface can be client-generated but populated from the server. For example, the worker request can be sourced from a network page form presented in a network page browser on a requesting client device, where the network page form comprises a business segment graphical control element and a request reason graphical control element, wherein the request is based on an input into the business segment graphical control element and an input into the request reason graphical control element. For example, a network page form comprises an escalation graphical control element and an escalation reason graphical control element, where the request is based on an input into the escalation graphical control element and an input into the escalation reason graphical control element. For example, a worker request can be sourced from a network page presented in a network page browser on the requesting client device, where the network page comprises a graphical user interface tab with an impacted business segment graphical control element, where the request is based on an input into the impacted business segment graphical control element. For example, a server can provide a requestor dashboard to a requestor client device over a network, where the requestor dashboard receives the worker request.

In block 804, the server may receive a unique project identifier, a project timeframe, a unique project skill identifier from the place request page. Such information is received from the client device over the network based on the block 802, such as via a submit button on the place request page or in real-time as the place request page is being populated.

In block 806, the server may present/display a request management page by transmitting the data to the client device. Such presentation occurs via a network page on a network browser on a client device over a network. For example, the network page can comprise a web page or a dedicated application graphical user interface page. The request management page comprises information obtained from the place request page, such as based on the block 804. For example, such information can be based on a generation of a ticket record dataset in a storage (e.g., a database), as disclosed herein.

In block 808, the server may display a project icon, the unique project identifier, the project timeframe, the unique project skill identifier, and/or a dynamically updated list of workers on the request management page. Such display can be on a single page or a plurality of pages, whether a single display area or multiple display areas, which can be scrollable. The request management page can comprise or be substantially defined via one or more GUI control elements. For example, one or more GUI control elements can comprise a widget, an accordion, an address bar, an adjustment handle, an alert dialog box, a breadcrumb, a button, a checkbox, a combo box, a context menu, a cycle button, a date picker, a dial, a dialog box, a disclosure widget, a drop-down list, a dropdown menu, an edit menu, a file dialog, a file menu, a frame, a grid view, a hamburger button, a hyperlink, an infobar, an inspector window, a label, a list box, a menu, a menu bar, a menu extra, a mouse-over, a navigation bar, a notification area, a palette window, a panel, a pie menu, a pop-up notification, a popover, a progress bar, a radio button, a ribbon, a scrollbar, a search box, a sidebar, a slider, a software widget, a spinner, a splash screen, a status bar, a tab, a text box, a toolbar, a tree view, a window, or any other visual element. The project icon is associated with the unique project identifier, as disclosed herein.

In block 810, the server may dynamically update the list of workers based on a skill match with the unique project skill identifier and a time availability within the project timeframe. Such dynamic update can be in real-time and can be based on automatic server-based searching, such as based on a generation of a ticket record dataset, of the storage for a worker profile dataset based on a match between a worker skill identifier in the worker profile dataset and a requesting skill identifier in the worker request and based on a requesting timeframe within the worker request being within an open slot in the worker work schedule of the worker profile dataset, such as automatically maintained via a network-based groupware calendar data source, such as Microsoft Exchange® or Microsoft SharePoint®. The search can be of any type, such as via a built-in search function, a fuzzy searching, or any other type of search. Searching can involve a heuristic pattern recognition. For example, the heuristic pattern recognition can be based on a Bayesian approach. For example, upon generating the ticket record dataset, the server searches various worker profiles stored in the storage for a worker profile, which has a worker skill identifier therein, such as RLSA, matching a requesting skill identifier, such as RLSA, from a worker request. Upon a skill set match, the server then searches the skill matching profiles, such as a subset of the various worker profiles stored in the storage, for time availability via one or more open slots in the skill matching profiles based on the requesting timeframe being within the one or more open slots in a worker work schedule of the skill matching profiles. For example, if the storage stores profiles A, B, C, D and the matching skill search returns profiles A, B, then the time availability search searches profiles A, B for an open slot in the schedules of profiles A, B. For example, a worker profile with more open slots or more continuous open slots or larger open slots can be preferred over a worker profile with less open slots or less continuous open slots or smaller open slots. In some embodiments, such order is reversed, where the server performs the time availability search for worker profiles and then performs the skill matching search based on the search results from the time availability search. In some embodiments, worker skill experience is taken into consideration, where a requestor can prioritize worker skill experience over time availability. For example, a recommendation engine, as disclosed herein, can provide a recommendation if a determination is made if there is a worker profile dataset match to a worker request, where the match is based on worker skills and worker timeframe availability.

In block 812, the server may receive an indication of a drag-and-drop gesture of a worker icon toward the project icon on the client device. The receipt is from a client device over the network. The indication is indicative of a network-based worker-to-project assignment and is based on a drag-and-drop gesture of the worker icon associated with the unique worker identifier to the project icon associated with the unique project identifier, where the drag-and-drop gesture would visually associate the worker profile dataset with the project profile dataset. For example, the drag-and-drop gesture is initiated by a user of a client device on which the request management page is displayed and is based on a drag of the worker icon from the list of workers toward the project icon or toward another visual element associated with the project icon, such as a box, a bucket, a container, a list, a menu, or any other visual element. Therefore, an assignment request is user generated.

In block 814, the server may assign a unique worker identifier based on the indication. For example, such assignment is via a worker profile dataset being associated with a project profile dataset based on the drag-and-drop gesture. Such association can be via a reference, a pointer, a flag, or any other means of associating.

In block 816, the server dynamically updates the list of workers based on the assignment. Such update may be automatic and can be in real-time. For example, such update can be based on associating the worker profile dataset with the project profile dataset, where one or more open slots in a schedule associated with the worker profile dataset, such as via a unique worker identifier, are automatically blocked off or reserved or hidden or made visually distinct from other workers projects or projects requests, such as to avoid overbooking or scheduling conflicts. Therefore, the worker icon that has experienced the drag-and-drop gesture is un-availed in the list of workers or made visually distinct in the list of workers or hidden in the list of workers or removed in the list of workers, which can be in real-time.

In block 818, the server may update the request management page such that the worker icon is visually associated with the project icon. For example, such update can show the worker icon being positioned in or in proximity of the project icon, such as in a visual element associated with the project icon, such as a box, a bucket, a container, a list, a menu, or any other visual element.

In some embodiments, a client or a server can be configured to reverse block 814 over a network. For example, such reversal can occur via disassociating, by the server, the unique worker identifier from the unique project identifier based on a disassociation request received from at least one of a requesting client or a assigning client over the network. Such disassociating can be via a same graphical user interface as used during associating. The server can reflect such disassociating in real-time. Further, such disassociation can occur via a drag-and-drop gesture on at least one of a requesting client or an assigning client, where such drag-and-drop gesture involves dragging a worker icon from a project icon, such as from a project bucket, toward a list of unique worker identifiers, which can be dynamically updated in real-time.

In some embodiments, one or more pointing device gestures can be used for any association, disassociation, or any other graphical user interface actions. For example, a pointing device can comprise, be a part of, or is at least one of a hand mouse, a touchpad, a track pad, a trackball, a joystick, a pointing stick, a stylus drag, a finger drag, a laser pen, a light pen, a light gun, a palm mouse, a foot mouse, an eye tracking device, a finger mouse, a steering wheel, a paddle, a jog dial, a space ball, a directional pad, a dance pad, or any other pointing device. For example, one or more of such gestures can comprise, be a part of, or is a tap, a double tap, a long press, a scroll, a pan, a flick, a two/multi-finger finger tap, a two/multi-finger finger scroll, a pinch, a zoom, a rotate, or any other way of combining a pointing device movement and a click which a software application recognizes as a specific computer event and responds in a manner particular to that software.

Figure 9A:
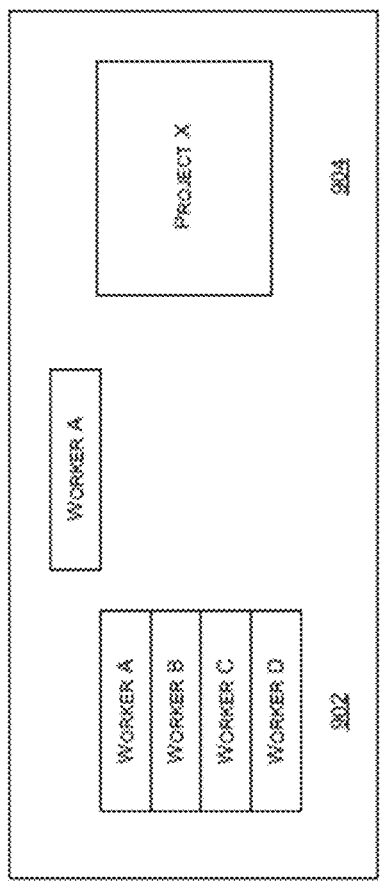
FIG. 9A shows a diagram of an example embodiment of a graphical user interface page as a worker icon is being dragged toward a project icon based on a drag-and-drop gesture according to the present disclosure.

FIG. 9A shows a diagram of an example embodiment of a graphical user interface page as a worker icon is being dragged toward a project icon based on a drag-and-drop gesture according to the present disclosure. A graphical user interface page 900 comprises a dynamically updated list of workers 902 comprising a plurality of worker icons for workers A, B, C, D and a project icon 904. Via a user operating a pointing device, a worker icon for a worker A is being dragged from the dynamically update list of workers 902 toward the project icon 904 in order to assign the worker A to the project X.

Figure 9B:
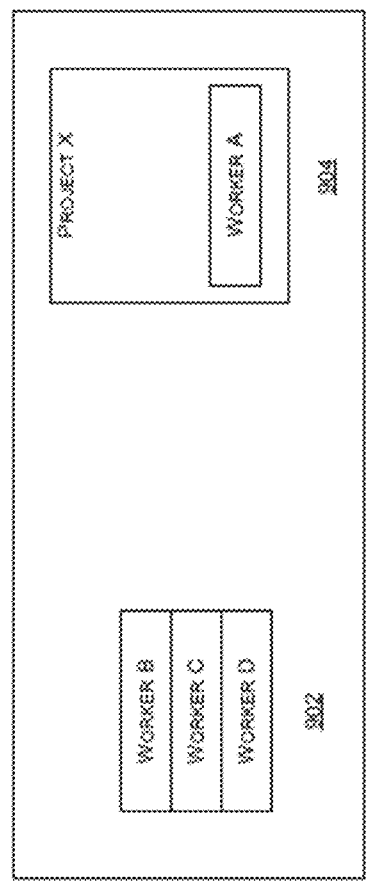
FIG. 9B shows a diagram of an example embodiment of a graphical user interface page as a worker icon is visually associated with a project icon based on a drag-and-drop gesture according to the present disclosure.

FIG. 9B shows a diagram of an example embodiment of a graphical user interface page as a worker icon is visually associated with a project icon based on a drag-and-drop gesture according to the present disclosure. The worker icon for the worker A is positioned within the project icon 904 for the project X. Therefore, the worker A is assigned to the project X. The dynamically updated list of workers 902 is updated, such as in real-time, such that the worker icon for the worker A is removed/invisible/hidden from the user of the pointing device and such that the worker icon for the worker A is removed/invisible/hidden from other assignors operating other clients over the network.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method of using a graphical user interface to assign workers to one or more projects, the method comprising:

transmitting, by a server, a first set of processor-executable instructions to a first client device to cause the first client device to display a first user interface configured to receive an input comprising a unique project identifier, a project timeframe, a requesting timeframe, and a requesting skill identifier, wherein the requesting timeframe does not exceed the project timeframe;

receiving, by the server, the input from the first client device;

identifying, by the server, a subset of worker profiles representing workers possessing a worker skill and a worker time availability matching the requesting skill identifier, the requesting timeframe and project timeframe specified by the input;

transmitting, by the server, a second set of processor-executable instructions to a second client device to cause the second client device to present a pop-up notification on a second user interface, wherein the second user interface is configured to display:

a project icon graphically representing at least one project, the unique project identifier associated with the project icon, the project timeframe, the requesting timeframe, the requesting skill identifier, and a dynamically updated list of workers comprising the workers that match the requesting skill identifier, the requesting timeframe and project timeframe specified by the input, wherein each of the workers of the dynamically updated list comprises a unique worker identifier and a worker icon, the worker icon being a graphical element representing at least one worker and visually indicating total hours available and one or more timeslots associated with at least a portion of hours available within the worker icon; and a utilization rate for each worker of the dynamically updated list of workers, the utilization rate corresponding to an amount of time assigned to projects for each worker skill identifier of that worker over a predetermined period of time; and assigning, by the server, a unique worker identifier to the unique project identifier based on a drag-and-drop gesture on the second user interface, wherein the drag-and-drop gesture comprises dragging the worker icon from the dynamically updated list of workers toward the project icon;

dynamically adjusting, by the server, the dynamically updated list of workers based on the assigning;

displaying, by the server, a message when a utilization rate of a worker associated with the unique worker identifier having at least one worker skill identifier satisfies a predetermined threshold; and updating, by the server, the second user interface, wherein the server renders the worker icon to be positioned within the project icon.

2. The method of claim 1, further comprising:
generating, by the server, an underutilization message informative of a utilization rate of a worker associated with a worker skill identifier below a predetermined threshold;
generating, by the server, a report informative of the assigning, wherein the report is based on the underutilization message;
displaying, by the server, the report to the second client device over the network.

3. The method of claim 1, further comprising:
generating, by the server, an overutilization message informative of a utilization rate of a worker associated with a worker skill identifier above a predetermined threshold;
generating, by the server, a report informative of the assigning, wherein the report is based on the overutilization message;
displaying, by the server, the report to the second client device over the network.

4. The method of claim 1, further comprising:
generating, by the server, a recommendation message via a recommendation engine, wherein the recommendation message recommends a worker based on the unique worker identifier;
displaying, by the server, the recommendation message on the second network page before the assigning.

5. The method of claim 4, further comprising:
training, by the server, a recommendation engine based on the assigning, wherein the recommendation engine is associated with the server.

6. The method of claim 4, wherein the recommendation message recommends a team comprising a worker associated with the unique worker identifier.

7. The method of claim 1, wherein the first network page is configured comprises a business segment graphical control element and a request reason graphical control element, wherein the input is based on an input into the business segment graphical control element and an input into the request reason graphical control element.

8. The method of claim 7, wherein the first network browser comprises an escalation graphical control element and an escalation reason graphical control element, wherein the requestor input is based on an input into the escalation graphical control element and an input into the escalation reason graphical control element.

9. The method of claim 1, wherein the first network page comprises a graphical user interface tab with an impacted business segment graphical control element, wherein the requestor input is based on an input into the impacted business segment graphical control element.

10. The method of claim 1, further comprising:
displaying, by the server, a Gantt chart to the second client device over the network, wherein the Gantt chart depicts worker utilization associated with the unique worker identifier.

11. The method of claim 1, wherein the first and the second client devices are the same client device.

12. A computer system of using a graphical user interface to assign workers to one or more projects, the computer system comprising:
a server configured to:
transmit a first set of processor-executable instructions to a first client device to cause the first client device to display a first network page on a first user interface configured to receive an input comprising a unique project identifier, a project timeframe, a requesting timeframe, and a requesting skill identifier, wherein the requesting timeframe does not exceed the project timeframe;
receive the input from the first client device;
identify a subset of worker profiles representing workers possessing a worker skill and a worker time availability matching the requesting skill identifier and the requesting timeframe and project timeframe specified by the input;
transmit a second set of processor-executable instructions to a second client device to cause the second client device to present a pop-up notification on a second user interface, wherein the second user interface is configured to display:
a project icon graphically representing at least one project,
the unique project identifier associated with the project icon,
the project timeframe,
the requesting timeframe,
the requesting skill identifier, and
a dynamically updated list of workers comprising the workers that match the requesting skill identifier, the requesting timeframe and project timeframe specified by the input,
wherein each of the workers of the dynamically updated list comprises a unique worker identifier and a worker icon, the worker icon being a graphical element representing at least one worker and visually indicating total hours available and one or more timeslots associated with at least a portion of hours available within the worker icon; and
a utilization rate for each worker of the dynamically updated list of workers, the utilization rate corresponding to an amount of time assigned to projects for each worker skill identifier of that worker over a predetermined period of time; and
assign a unique worker identifier to the unique project identifier based on a drag-and-drop gesture on the second network page in the second user interface, wherein the drag-and-drop gesture comprises dragging the worker icon from the dynamically updated list of workers toward the project icon;
dynamically adjust the dynamically updated list of workers based on the assigning;
display a message when a utilization rate of a worker associated with the unique worker identifier having at least one worker skill identifier satisfies a predetermined threshold; and update the second user interface, wherein the server renders the worker icon to be positioned within the project icon.

13. The computer system of claim 12, wherein the server is further configured to:
generate an underutilization message informative of a utilization rate of a worker associated with a worker skill identifier lower than a predetermined threshold;
generate a report informative of the assigning, wherein the report is based on the underutilization message;
display the report on the second client device over the network.

14. The computer system of claim 12, wherein the server is further configured to:
generate an overutilization message informative of a utilization rate of a worker associated with a worker skill identifier above a predetermined threshold;
generate a report informative of the assigning, wherein the report is based on the overutilization message;
display the report on the second client device over the network.

15. The computer system of claim 12, wherein the server is further configured to: generate a recommendation message via a recommendation engine, wherein the recommendation message recommends a worker based on the unique worker identifier;
display the recommendation message on the second network page before the assigning.

16. The computer system of claim 15, wherein the server is further configured to: train a recommendation engine based on the assigning, wherein the recommendation engine is associated with the server.

17. The computer system of claim 15, wherein the recommendation message recommends a team comprising a worker associated with the unique worker identifier.

18. The computer system of claim 12, wherein the first network page is configured comprises a graphical control element and a request reason graphical control element, wherein the input is based on an input into the business segment graphical control element and an input into the request reason graphical control element.

19. The computer system of claim 18, wherein the first network browser comprises an escalation graphical control element and an escalation reason graphical control element, wherein the requestor input is based on an input into the escalation graphical control element and an input into the escalation reason graphical control element.

20. The computer system of claim 12, wherein the first network page comprises a graphical user interface tab with an impacted business segment graphical control element, wherein the requestor input is based on an input into the impacted business segment graphical control element.

\* \* \* \* \*

UNITED STATES PATENT AND TRADEMARK OFFICE
CERTIFICATE OF CORRECTION

| | | |
|---|---|---|
| PATENT NO. | : 11,144,853 B1 | Page 1 of 1 |
| APPLICATION NO. | : 15/384092 | |
| DATED | : October 12, 2021 | |
| INVENTOR(S) | : Robert Waterman et al. | |

It is certified that error appears in the above-identified patent and that said Letters Patent is hereby corrected as shown below:

On the Title Page

Item (72), please correct:
"Inventors: Robert Waterman, Longmeadow, MA (US); Daniel Lunardini, Westfield, MA (US)"

To read:
-- Inventors: Robert Waterman, Longmeadow, MA (US); Daniel Lunardini, Westfield, MA (US); James Salzer, Springfield, MA (US); Jessica Madru, Springfield, MA (US) --

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*